UNITED STATES PATENT OFFICE.

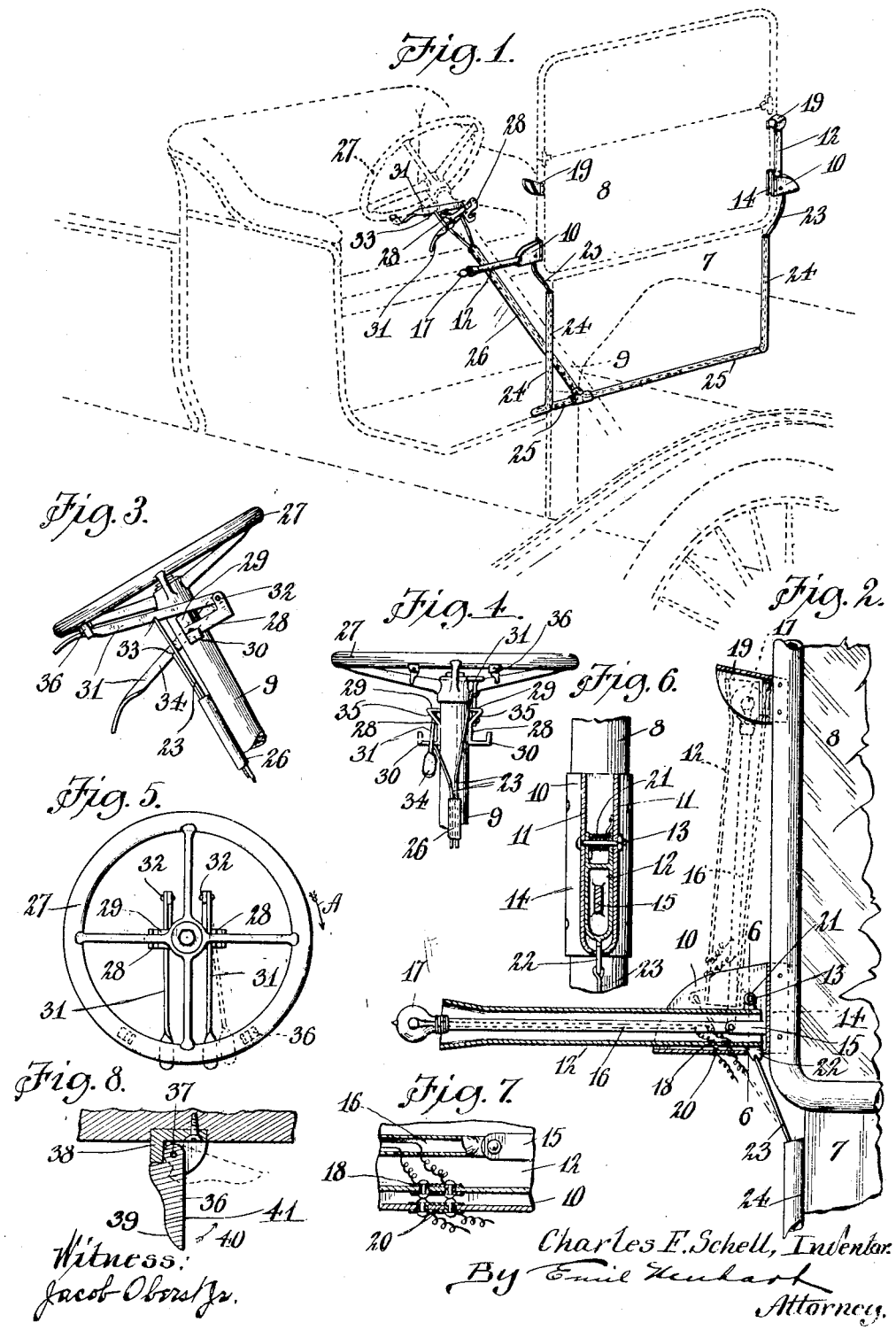
C. F. SCHELL.
SIGNALING DEVICE.
APPLICATION FILED JAN. 3, 1916.
1,337,669. Patented Apr. 20, 1920.
Charles F. Schell, Inventor.

CHARLES F. SCHELL, OF BUFFALO, NEW YORK.

SIGNALING DEVICE.

1,337,669. Specification of Letters Patent. Patented Apr. 20, 1920.

Application filed January 3, 1916. Serial No. 69,956.

*To all whom it may concern:*

Be it known that I, CHARLES F. SCHELL, a citizen of the United States, residing at Buffalo, in the county of Erie and State of New York, have invented certain new and useful Improvements in Signaling Devices, of which the following is a specification.

My invention relates to a signaling device, and more particularly to a device of this kind especially designed for use on automobiles, or other vehicles and arranged to enable the party operating or in charge of the vehicle to display a signal in accordance with the usual custom with which the driver of an automobile extends his arm at one or the other side of the vehicle as a signal that he is about to cause the vehicle to be turned in the direction in which his arm is extended.

In this invention I substitute mechanical means for the person's arm, and associate therewith an electric light which is placed in circuit when said means is swung into signaling position.

The primary object of my invention is to provide a simple and inexpensive device for this purpose which can be conveniently operated from a point or points in close proximity to the steering wheel.

Another object of my invention is to so construct the signaling device that when the signaling arms or members are retracted the electric lights associated therewith become extinguished, or at least invisible.

A further object is to so arrange the signaling arms or members that they are visible from both the rear and front when extended as a warning to other vehicles following closely behind, informing them of the intention to deviate from a straight course, and as a notice to policemen regulating traffic and to pedestrians and others desiring to cross in front of the vehicle.

A further object is to so construct the signaling device and arrange the manipulating or operating means thereof so that it is unnecessary for the party operating the vehicle to remove his hands from the steering wheel; and to provide means for causing the signaling arms or members to be moved automatically into retracted position.

With these and other objects in view, the invention consists in the novel features of construction and in the arrangement and combination of parts to be hereinafter described and particularly pointed out in the subjoined claims.

In the drawings,—

Figure 1 is a perspective view of one embodiment of my invention showing the manner of applying the same to an automobile indicated in perspective view by dotted lines.

Fig. 2 is a sectional elevation showing one of the signaling arms or members, its support and adjacent coöperating parts attached to the wind-shield and dash-board of an automobile.

Fig. 3 is a side elevation of the upper end of the steering post of an automobile, showing my controlling mechanism attached thereto.

Fig. 4 is a rear view of the same.

Fig. 5 is a plan view of the steering wheel and post showing the controlling mechanism for my signaling device attached thereto.

Fig. 6 is an enlarged cross section taken on line 6—6, Fig. 2.

Fig. 7 is a detail view of the electric current breaking means.

Fig. 8 is a detail view of one of the releasing fingers attached to the steering wheel.

Reference being had to the drawings in detail, like numerals of reference refer to like parts in the several figures.

The reference numeral 7 indicates the dash-board of an automobile, 8 the wind-shield, and 9 the steering post forming part of steering mechanism, all of which are well known parts of an automobile, and the purpose and operation of the same clearly understood.

Secured to the vertical side bars of the wind-shield 8 are brackets 10 having U-shaped portions 11 extending outwardly from said side bars, and in each of these U-shaped portions a tubular signaling arm or member 12 is pivotally secured, the pivot being offset, as at 13. Said pivot is at a point above the tubular signaling arm or member 12 when the latter is extended and assumes a horizontal position, as shown at the left of Fig. 1 and as shown in full lines in Fig. 2; whereas when said tubular signaling member is retracted or swung into upright position, as shown at the right in Fig. 1 and in dotted lines in Fig. 2, said pivot 13 is between said signaling member and the adjacent vertical side bars of the wind-shield.

Extending outwardly from the securing portion of the bracket 10, which embraces said side bar, as at 14, is an arm 15 to which is pivotally secured a lamp rod 16 having an incandescent electric lamp 17 secured to its outer end, said lamp having circuit wires connected thereto which may extend through said lamp rod 16 and have connection at their inner ends to contacts 18 extending from the side of the signaling arm or member at its inner pivoted end. Said lamp rod extends through the tubular signaling arm or member and the pivot thereof is offset with respect to the pivot of said signaling arm or member so that when the latter is swung into a horizontal position, which is the signaling position, the incandescent lamp 17 projects from the outer open end thereof. When, however, said signaling arm or member is swung into retracted or upright position, said member moves outwardly with respect to the lamp rod 16 so that the incandescent lamp is retracted or drawn into the tubular signaling arm or member, the outer end of which is flared to conveniently receive said lamp.

In order to close the outer open end of said tubular signaling member when the latter is in retracted or upright position, a cap or hood 19 is secured to the side bar of the wind-shield, the hood being tapered downwardly, as shown in Fig. 1, to conform to the flaring end of said signaling member. In this manner the signaling lamp is protected against the elements of the weather, and the cap or hood serves as a guard or retainer for the signaling arm so that it cannot sway forwardly or rearwardly and so that rattling thereof is prevented.

Secured to each bracket 10 are contacts 20 which are adapted to be engaged by the contacts 18 on the coöperating tubular arm or member 12, electric wires being connected to said contacts 20 which lead to any suitable source of current for lighting said signaling lamp when the signaling member is swung downwardly into horizontal or signaling position. This is a decided advantage, as the signal can be seen at night as well as during the day.

Each of the signaling arms or members and its inclosed parts are normally held in retracted or upright position by a torsional spring 21 which surrounds the pivot of said arm or member and has one end acting against said arm or member and its other end in contact with a fixed point of the bracket 10, as is common in torsional springs of this type. Any other arrangement, however, may be provided for retaining the signaling member normally in retracted or upright position.

Although I have described the construction and operation of only one of said signaling arms or members, it is to be understood that the other signaling arm or member is similarly constructed and that both are operated alike; each, however, being independently operated so as to signal at the right or left of the vehicle, depending on the direction in which the vehicle is to turn.

Each of the signaling arms or members has an outstanding lug 22 formed thereon to which an operating cord 23 is secured. Said cords extend downwardly through vertical tubes 24 arranged at the sides of the dash-board 7, thence through horizontally-disposed tubes 25 extending inwardly from said vertical tubes, and finally through an inclined tube 26 extending upwardly alongside the steering post 9, from the upper end of which they project.

Secured to the steering post directly beneath the steering wheel 27, which latter is arranged at the upper end of the steering post, is a pair of brackets 28 which are disposed at opposite sides of said post, each bracket having a lever rest or retaining ledge 29 at its upper end and an enlarged notched portion 30 at its lower end. Controlling levers 31 are pivotally secured to the brackets 28, as at 32, the pivoted points of said levers being in a plane in advance of the steering post. Said levers are loosely pivoted so that they may have slight lateral movement and they are arranged to extend rearwardly underneath the rim of the steering wheel at its rearmost point. The ends of the operating cords 23 extending from the upper end of the tube 26 are connected to the levers 31, as at 33, and these levers are normally in lowered position, as shown at 34. Each of the controlling levers and the operating cord connected thereto, may be said to constitute manipulating or actuating mechanism. When in normal position, these controlling levers are entered into the notches 30 of the brackets, and at such times the operating cords 23 are slackened so that the springs 21 surrounding the pivots of the signaling arms or members act to draw the latter into normal or retracted position.

In order to cause either of the signaling members to be extended to signaling position, it is simply necessary to lift the coöperating controlling lever, exerting slight pressure laterally toward the steering post so that said lever rides upwardly along the inner wall of the notch 30 and in contact with an inclined portion 35 formed on the bracket and leading from the notch 30 to the lever or retaining ledge 29, the lever moving inwardly automatically onto the said lever rest or ledge after passing over said inclined portion 35. The controlling lever is retained in such position, due to the fact that the operating cord 23 attached thereto is drawn taut and tends to pull said lever downwardly with a slight pull inwardly. It is of course understood that the direction in which the turn is to be made is indicated by manipulating the signaling arm or member a short period of time prior to making the turn, so as to give vehicles in rear and parties in front sufficient notice of the intention to make a turn.

As shown in the drawings, the controlling lever at the right of the steering post is elevated and engages its coöperating retaining ledge, and this lever is operatively connected with the signaling arm or member at the right of the wind-shield. When the point of making the turn is reached, the steering wheel is rotated to the right or in the direction of the arrow A, Fig. 5, which causes the vehicle to turn to the right, and during the movement of the steering wheel in the direction mentioned, a releasing finger 36 depending from the rim of the steering wheel rides idly over the free end of the elevated controlling lever. During the final portion of the reverse movement of the steering wheel to steer the vehicle in a straight course, this releasing finger engages the free end of the elevated controlling lever and moves said controlling lever laterally a sufficient distance to disengage it from its retaining ledge 29. This releases the coöperating signaling arm or member and the spring 21 of said arm or member acts to return the same to normal or upright position, thereupon drawing on the cord 23 connected thereto and pulling the controlling lever into its lowered position within the notch 30 of its coöperating bracket.

As shown in Fig. 8, there is a releasing finger provided for each controlling lever, and each releasing finger is pivotally secured, as at 37, to a lug 38 secured to the underside of the steering wheel. Each finger has an inclined portion 39 adapted to engage its coöperating controlling lever and swing said finger laterally in the direction of the arrow 40 so as to ride idly over said lever when the wheel is rotated in one direction, but when said wheel is reversed in movement, the straight edge 41 of said finger engages said lever, at which time the releasing finger is held against swinging movement by a toe or stop 42 formed near its upper end and engaging an abutment 43 on the lug 38. This action releases the controlling lever from the retaining ledge and permits the several parts of the device to be returned to normal position. The releasing fingers are oppositely arranged, so that they work in reverse manner to release their coöperating controlling levers.

It is to be understood that the construction shown in the accompanying drawings is merely illustrative of the principle involved and changes may be resorted to and various modifications made without departing from the spirit of my invention or sacrificing any of the advantages thereof.

Having thus described my invention, what I claim is:—

1. The combination with a vehicle, of a spring-retained signaling member pivotally secured to said vehicle and normally held in retracted position, said signaling member having a hollow portion, a pivotally supported lamp arm within said hollow portion, a lamp carried by said lamp arm, and means to move said signaling member from its normal or retracted position to its extended or signaling position, said lamp arm being movable with said signaling member and having its pivot out of line with the pivot of said signaling member to cause said lamp to be projected from said hollow portion when said signaling member is moved to signaling position.

2. The combination with a vehicle, of a hollow signaling member pivotally secured to the vehicle, a lamp rod extending through said signaling member and pivotally secured at a point offset with respect to the pivot of said signaling member, a lamp secured to the outer end of said lamp rod, and means for retaining said signaling member in normal or retracted position with said lamp in retracted position within said hollow member, said lamp being projected from the outer end of said hollow member when the latter is moved into signaling position.

3. The combination with a vehicle, of a bracket secured to said vehicle, a tubular signaling member pivotally secured to said bracket, a pivoted lamp rod extending centrally through said tubular signaling member and having its pivot offset with respect to the pivot of said tubular member, a lamp secured to said lamp rod, and means for normally holding said tubular member in vertical position with said lamp rod retracted within said tubular member, said lamp rod moving lengthwise within said tubular member when swinging the latter from vertical into extended or signaling position to cause said lamp to be projected beyond the outer end of said tubular member.

4. A signaling device comprising two pivoted members adapted to swing together, said members having their pivots out of line and one of said members moving lengthwise relative to the other during the swinging movement of said members.

5. A signaling device comprising two pivoted members arranged one within the other and having their pivots arranged out of line, the outer member being movable from one position to another and the inner member having a light adapted to be concealed by said outer member when in one position and be visible when said outer member is in its other position.

6. A signaling device comprising a swinging arm composed of two relatively movable members, one of said members carrying a lamp visible only when the other member is moved into signaling position, said other member concealing said light when in normal position, and a hood adapted to receive the free end of said arm only to prevent swaying movement of the same when in normal position and to protect said lamp.

7. A signaling device comprising a swinging tubular arm normally held in vertical position and adapted to be swung into horizontal or approximately horizontal position, said arm having a signaling lamp at its free end, and a hood having a fixed position adapted to receive the free end only of said arm to close the latter and protect said lamp, said arm being adapted to engage the opposite walls of said cap so as to be held against swaying movement when in normal position.

In testimony whereof I affix my signature.

CHARLES F. SCHELL.